United States Patent [19]

Kawaguchi et al.

[11] Patent Number: 4,580,604
[45] Date of Patent: Apr. 8, 1986

[54] DISCHARGING VALVE DEVICE FOR A COMPRESSOR

[75] Inventors: Susumu Kawaguchi, Shizuoka; Koji Ishijima; Osamu Iwabuchi, both of Fujieda; Takuho Hirahara, Shizuoka; Kazuhiro Nakane, Shizuoka; Fumiaki Sano, Shizuoka, all of Japan

[73] Assignee: Mitsubishi Denki Kabushiki Kaisha, Tokyo, Japan

[21] Appl. No.: 613,064

[22] Filed: May 22, 1984

[30] Foreign Application Priority Data

Jun. 23, 1983 [JP] Japan ............................ 58-97338[U]
Jun. 23, 1983 [JP] Japan ............................ 58-97339[U]
Dec. 6, 1983 [JP] Japan ............................... 58-230051

[51] Int. Cl.$^4$ ............................................. F16K 15/14
[52] U.S. Cl. ........................................................ 137/856
[58] Field of Search ................................. 137/855–858

[56] References Cited

U.S. PATENT DOCUMENTS

| 73,038 | 1/1868 | Pollard ................... 137/858 |
| 338,609 | 3/1886 | Nysewander ................. 137/858 |
| 3,606,588 | 4/1969 | Romerhaus . | |

FOREIGN PATENT DOCUMENTS

| 1475955 | 10/1965 | Fed. Rep. of Germany . | |
| 1467898 | 12/1965 | France . | |
| 5712909 | 9/1978 | Japan . | |
| 59-34078 | 2/1984 | Japan .................... 137/855 |
| 597544 | 4/1978 | Switzerland . | |
| 672884 | 5/1952 | United Kingdom ............ 137/855 |

OTHER PUBLICATIONS

Proceedings of the 1982 Purdue Compressor Technology Conference (Jul. 21-23, 1982), pp. 149-158.

Primary Examiner—Robert G. Nilson
Attorney, Agent, or Firm—Oblon, Fisher, Spivak, McClelland & Maier

[57] ABSTRACT

A discharging valve device for a compressor discharges gas compressed in a compression chamber outside said chamber against an urging force of a discharging valve to a valve seat and resistance of breaking a film of a lubricating oil deposited at and near a cacting area formed between the valve seat and the discharging valve. The discharging valve device comprises a discharging port communicated with a compression chamber, a valve seat formed at the peripheral portion of said discharging port and having a curvature in cross section, and a discharging valve which is forcibly in contact with a part of said valve seat so as to open and close said discharging port depending on pressure in said compression chamber, wherein a contacting width of the sealing part formed by the contact through an oil film between said discharging valve and said valve seat is smaller than a contacting width of an oil film formed in case of combination of a flat discharging valve with a valve seat having a uniform curvature in cross section.

7 Claims, 30 Drawing Figures

DISCHARGING VALVE DEVICE FOR A COMPRESSOR

BACKGROUND OF THE INVENTION

1. Field of the Invention

The present invention relates to a discharging valve device for a compressor installed in a refrigeration cycle. More particularly, it relates to an improved discharging valve device for increasing discharging efficiency.

2. Description of the Prior Art

FIG. 1 shows a sectional view of an important part of a conventional discharging valve device for a compressor disclosed in Japanese Examined Patent Publication No. 12909/1972. In FIG. 1, the reference numeral 1 designates a discharging port formed in a housing wall 1a; the numeral 2 refers to a valve seat which is formed integrally with the housing wall 1a at and around the discharge opening of the discharging port 1, the shape of the valve seat being like an upper half portion of a doughnut, in other words, in a semicircular shape having a certain curvature in cross section, the numeral 3 denotes a discharging valve fixture and the numeral 4 designates a discharging valve made of a resilient material, which has one end secured to the housing wall 1a and the other end interposed between the valve seat 2 and the discharging valve fixture 3 thereby to perform opening and closing operations for the discharging port 1 depending on pressure difference produced in a compression chamber (not shown).

In the conventional discharging valve device for a compressor having the construction described above, when gas compressed in a compression chamber (not shown) reaches a predetermined pressure-discharging level, the discharging valve 4 brought in contact with the valve seat 2 formed at the discharging side of the discharging port 1 communicating with the compression chamber is opened due to discharging pressure to thereby discharge the compressed gas through an air gap formed between the discharging valve 4 and the valve seat 2. Then, reduction in pressure in the compression chamber actuates the discharging valve 4 on its closing side to bring the discharging valve 4 onto the valve seat 2 thereby to allow again compression in the compression chamber. Thus, compressing and discharging operations are repeatedly carried out.

In order to carry out these operations smoothly, it is especially essential to prevent phenomena of reversely flowing of gas at the time of closing of the discharging valve 4 on the valve seat 2 and of delay in opening of discharging valve 4 at the time of opening operation. From the viewpoint of assuring the smooth operations, provisions are made in such a manner that an oil film is formed at the contacting area of the discharging valve 4 to the valve seat 2 to increase gas sealing property; the outer surface of the valve seat 2 is so made as to have a certain curvature in cross section, that is, to form an upper portion of a doughnut-like shape so that a circular contacting area is provided between the discharging valve 4 and the valve seat 2; and the diameter of the circular contacting area of the valve seat 2 is made greater than that of the discharging port 1 whereby contacting pressure of the discharging valve 4 to the valve seat 2 is increased.

The conventional discharging valve described above is, however, disadvantageous in that when the gas compressed in the compression chamber is discharged, a lubricating oil is discharged together with the discharged gas, on account of which the oil film spreads in a strip form over the contacting area between the discharging valve 4 and the valve seat 2 to be beyond a predetermined contacting width for sealing, with the consequence of increasing resistance of the oil film due to the spread oil film when the discharging valve is to opened whereby there causes delay in opening operation. This results in increase of input power for the compressor.

Further, there is a problem of noise produced when the discharging valve 4 is actuated for opening operation since resistance of the oil film is large.

SUMMARY OF THE INVENTION

It is an object of the present invention to overcome the disadvantage inherent in the conventional discharging valve device and to provide a discharging valve device for a compressor, having excellent discharging efficiency, constructed in such a manner that the contacting width for sealing formed by an oil film which is provided by contact of a discharge valve and a valve seat is smaller than a contacting width for sealing formed by an oil film formed in the case of combination of a flat discharging valve with a valve seat having a uniform curvature in cross section, to thereby prevent delay in opening operation of the discharging valve.

It is another object of the present invention to provide a discharging valve device for a compressor, having excellent discharging efficiency, in which a contacting area formed between a valve seat and a discharging valve is determined at the inside or the outside with respect to the top portion of the valve seat to prevent delay in opening operation of the discharging valve.

It is still another object of the present invention to provide a discharging valve device for a compressor, having excellent discharging efficiency, in which the ratio of the diameter of the top portion of the valve seat to the diameter of the discharging port is 1.5 times or more; a curved surface is formed at the outside of a contacting area formed between the valve seat and the discharging valve; and a step is formed at the inside of the valve seat with respect to the top portion thereof to thereby prevent reverse flow of gas in the closing state of the valve seat and delay in opening operation of the discharging valve.

It is further object of the present invention to provide a discharging valve device for a compressor, having excellent discharging efficiency, in which in view of the cross section of a valve seat, a curved surface having a certain curvature is formed at the inside of a contacting area formed between the valve seat and a discharging valve and a step is formed at the outside of the valve seat with respect to the contacting area to thereby prevent reverse flow of gas in the closing state of the discharging valve and delay in opening operation of the discharging valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the discharging valve device for a compressor of the present invention will be described in detail.

Figure 2:
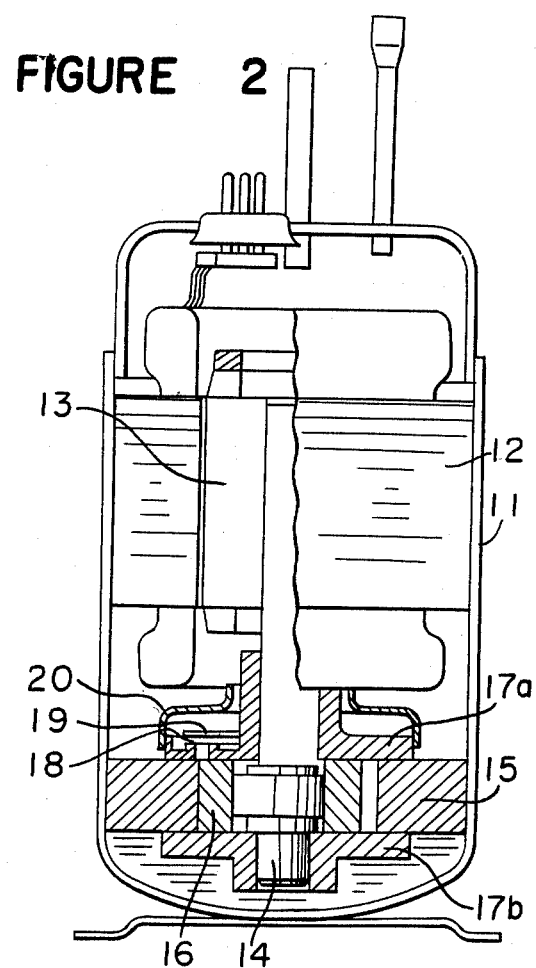
FIG. 2 a vertically cross-sectional view showing a compressor in which the discharging valve device according to the present invention is installed.

First of all, description will be made as to a compressor in which the discharging valve device of the present invention is installed with reference to FIG. 2. A sealing container 11 holds therein an electric motor comprising a stator 12 and a rotor 13, a crankshaft 14 driven by the motor, a cylinder 15, a piston 16 and vanes (not shown) for defining a compression chamber to form a high pressure chamber and a low pressure chamber so as to perform compressing operations. There are placed, at both ends of the cylinder, side housings 17a, 17b which form the compression chamber and serves as bearings for the crankshaft 14.

A refrigerant is introduced to the compression chamber through an intake pipe (not shown) and is compressed by means of the piston 16 eccentrically rotated by the crankshaft 14 driven by the motor, the cylinder 15 and vanes (not shown). When pressure in the compression chamber becomes higher than an inner pressure in the sealing container 11, the discharging valve 18 is opened to discharge the gas in the compression chamber into a discharging muffler 20 from the discharging port formed in the side housing 17a. A discharging valve fixture 19 is provided to restrict the movement of a discharging valve 18. The refrigerant gas subjected to reduction in noise in the discharging muffler is discharged into the sealing container 11 and is fed to a heat exchanger through a discharging pipe. Thus, refrigeration cycle is repeated.

Figure 3:
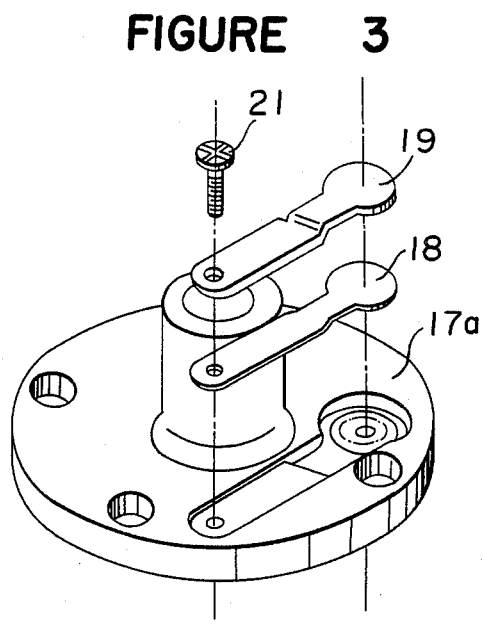
FIG. 3 is an enlarged perspective view of an embodiment of the discharging valve device of the present invention.

FIG. 3 is an enlarged perspective view showing general construction of the discharging valve device of the present invention, the detail of the construction being described below, in which a discharging port is formed in the side housing 17a and each end of the discharging valve 18 and the discharging valve fixture 19 is secured to the side housing 17a by a screw.

A discharging valve device for a compressor of the first embodiment of the present invention will be described with reference to FIG. 4.

The reference numeral 1 designates a discharging port formed in the housing 17a, the numeral 22 refers to a valve seat which is substantially in semi-circular in cross section having a substantially uniform curvature and is formed at the peripheral portion of the discharging port 1 and the numeral 19 indicates a discharging valve fixture and the numeral 18a represents a discharging valve made of a resilient thin plate in which a raised portion is formed at a position corresponding to the valve seat 22 by stamping process so that the corner of the raised portion is in contact with the valve seat at a position outside the top portion of a curved surface having a curvature.

Figure 1:
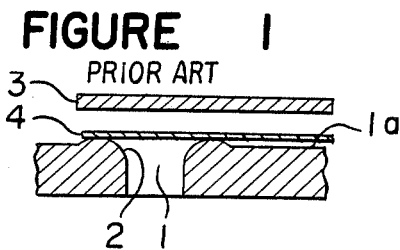
FIG. 1 is a sectional view partly omitted of an essential portion of a conventional discharging valve device for a compressor.

The operation of the first embodiment of the present invention is substantially the same as that of the conventional device show in FIG. 1 provided that the discharging valve 18a is brought into contact with the valve seat 22 at a position outside the top portion of the valve seat 22 to prevent the refrigerant gas from reversely flowing from a high pressure portion outside the compression chamber (not shown) into the compression chamber.

When the discharging valve 18a is about to be opened, there is resistance at a contacting area formed between the discharging valve 18a and the valve seat 22. The resistance is determined by the amount of deposited oil film, namely, a contacting width for sealing formed by the oil film and the thickness of the oil film. In the first embodiment of the present invention, provision of the raised portion reduces the contacting width for sealing to control the content of the oil film deposited whereby the resistance of the oil film produced at the opening operation of the discharging valve 18a is reduced and accordingly there is no risk of delay in opening operation of the discharging valve. Further, noise produced in the opening operation of the discharging valve 18a which breaks the oil film for prevention of the reverse flow of the gas can be suppressed due to the reduced resistance of the oil film.

Figure 5:
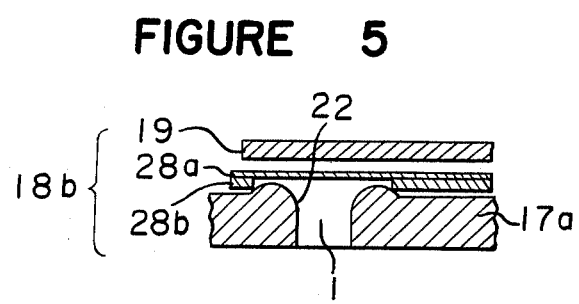
FIG. 5 is a sectional view of an essential part of the second embodiment of the present invention.
Figure 6:
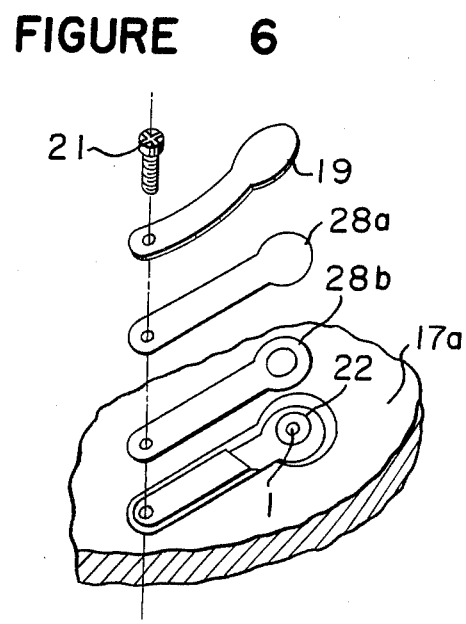
FIG. 6 is a perspective view in a disassembled state of the valve discharging device as shown in FIG. 5.

The second embodiment of the present invention will be described with reference to FIGS. 5 and 6. In FIG. 5 showing the construction of the discharging valve device in cross section and FIG. 6 showing a disassembled state of the discharging valve device, a discharging valve 18b is constituted by discharging valve elements 28a and 28b and the discharging valve element 28b is provided with an opening at a position corresponding to the discharging port 1. A contacting area is formed between the discharging valve element 28b and the valve seat 22 to prevent the refrigerant gas from flowing from a high pressure portion outside the compression chamber (not shown) to the compression chamber. The discharging valve element 28b is brought into contact with the valve seat 22 at a position outside the top portion of the curved surface having a curvature. With the construction, delay in the opening operation of the discharging valve 18b and generation of noise can be prevented as in the first embodiment. Naturally, the second embodiment of the present invention should have a structure such that the discharging valve element 28b is separated from the valve seat 22 before the discharging valve element 28b is separated from the discharging valve element 28a. Such construction can be easily obtained by making a contacting surface area of the oil film formed between the discharging valve elements 28a, 28b greater than that between the discharging valve element 28b and the valve seat 22.

In the first and second embodiments, a raised portion is formed in a discharging valve at a position corresponding to a valve seat or a plurality of discharging valve elements having a shape unlike each other are used to form a contacting area between the discharging valve element and the valve seat at a position outside the top portion of the curved surface having a curvature. Accordingly, the oil film formed between the discharging valve and the valve seat are limited and the resistance of the oil film produced at the opening operation of the discharging valve is reduced to prevent delay in the opening operation of the discharging valve. Further, noise produced at the breaking of the oil film is suppressed because there requires only small energy to break the oil film at the opening operation of the discharging valve.

Figure 7:
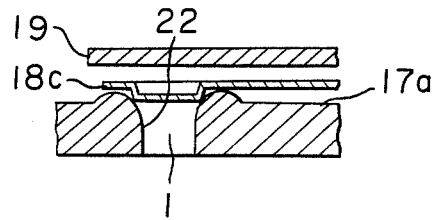
FIG. 7 is a sectional view of an essential part of the third embodiment of the present invention.

In the next place, the third embodiment of the present invention will be described with reference to FIGS. 7 and 8. The same reference numerals designate the same or corresponding parts and description of these parts is omitted. In FIG. 7 showing the construction of the discharging valve in cross section, a discharging port 1 is formed in a housing 17a and a valve seat 22 having a substantially uniform curvature in cross section is formed at the peripheral portion of the discharging port 1. There is provided a discharging valve 18c on which a discharging valve fixture 19 is placed to push the discharging valve downwardly. A raised portion is formed in the discharging valve at a position corresponding to the valve seat 22 so that the corner of the raised portion is brought into contact with the inside the top potion of the curved surface having a curvature of the valve seat.

Figure 4:
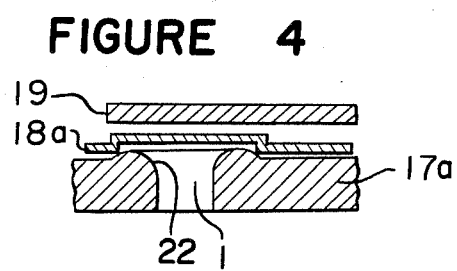
FIG. 4 is a sectional view of an essential part of the first embodiment of the discharging valve device of the present invention.

The operation of the third embodiment of the present invention is substantially the same as that of the first embodiment as described with reference to FIG. 4, provided that a contacting area is formed between the corner of the raised portion of the discharging valve 18c and the inside portion of the valve seat 22 to hermetically seal gas so as no to reversely flow from a high pressure portion outside the compression chamber (not shown) to the compression chamber. The resistance of the oil film at the opening operation of the discharging valve 18c is mainly determined depending on the content of the oil film deposited in the contacting area between the discharging valve 18c and the valve seat 22, in other words, depending on both the width and the thickness of the oil film in of the contacting area. However, since the third embodiment of the present invention is constructed in such a manner that a raised portion is formed in the discharging valve 18c to reduce the width of of the oil film for the purpose of control of oil film content and reduction in resistance of the oil film at the opening operation of the discharging valve 18c, delay in the opening operation is eliminated. Further, noise produced by breaking the oil film at the opening operation of the discharging valve 18c is suppressed due to the reduction in the oil film resistance.

Figure 8:
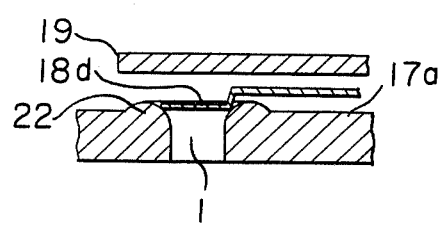
FIG. 8 is a sectional view of an essential part of the fourth embodiment of the present invention.

FIG. 8 is a cross sectional view showing a modification of the fourth embodiment of the present invention. In FIG. 8, the discharging valve 18d is formed by bending it at two points so that the free end of the discharging valve extends in parallel to the base portion of the same. Accordingly the free end is brought to contact with the valve seat 22 at a position inside the top portion of the curved surface having a curvature while the corner of the bend portion is brought into contact with the diametrically opposite side of the valve seat. This modified embodiment is capable of prevention of delay in the opening operation of the discharging valve 18d and suppression of noise.

In the third and fourth embodiments, a corner portion is formed in the discharging valve 18c or 18d at a position corresponding to the valve seat 22 and the corner is made in contact with the valve seat at a position inside the top portion of the curved surface of the valve seat whereby deposition of the oil film at the contacting area formed between the discharging valve and the valve seat is limited and the resistance of the oil film produced when the discharging valve is about to be reopened is reduced to thereby prevent delay in the opening operation of the discharging valve. Further, noise produced by breaking the oil film at the opening operation of the discharging valve 18c or 18d is suppressed due to the decreasing of energy for breaking the oil film.

Figure 9:
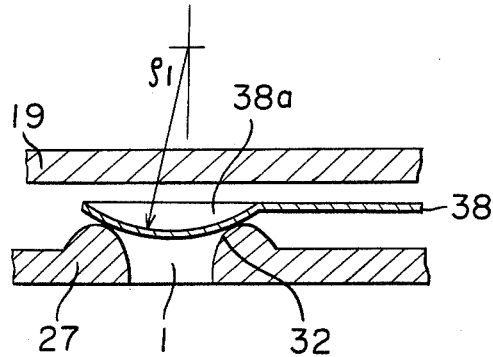
FIG. 9 is a longitudinally sectional view of an essential part of the fifth embodiment of the present invention.
Figure 11:
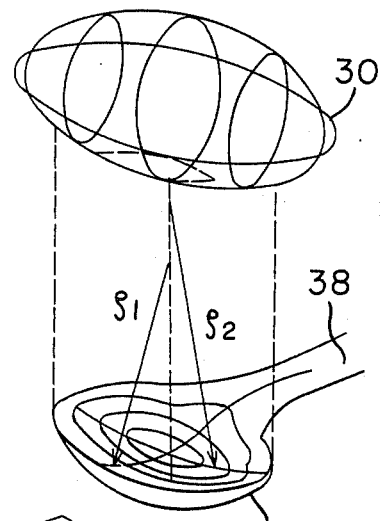
FIG. 11 is a diagram for explanation of the fifth embodiment of the present invention.
Figure 10:
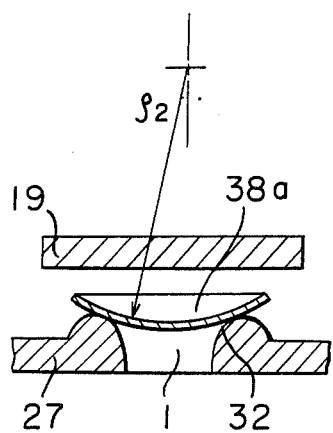
FIG. 10 is a cross-sectional view showing the embodiment in FIG. 9 by cutting it transversely and turning by 90°.
Figure 10:
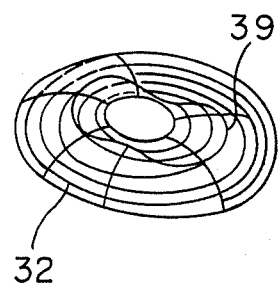

The fifth embodiment of the present invention will be described with reference to FIGS. 9 to 11. FIG. 9 is a cross sectional view showing the construction of the discharging valve device. A discharging port 1 is formed in a housing 27. A valve seat 32 is formed integrally with the housing 27 to project at the peripheral portion of the discharging port 1. The discharging valve fixture 19 is placed above a discharging valve 38 of a thin plate which is in contact with a position near the top portion of the valve seat 32. A recessed portion 38a is formed in the discharging valve 38 by, for instance, stamping operation. In FIG. 9, the recessed portion 38a is shown to have a curved surface having a radius of curvature $\rho_1$ in cross section. FIG. 10 is a sectional view showing the discharging valve device of FIG. 9 by horizontally turning it by 90° and by cutting it vertically. In FIG. 10, the recessed portion 38a has a radius of curvature $\rho_2$ being different from the radius of curvature $\rho_1$. In FIG. 11, the recessed portion 38a of the discharging valve 38 has a curved surface which consists of a part of the surface of an elliptical body 30 wherein the radius of curvature $\rho_1$ in the direction X is different from the radius of curvature $\rho_2$ in the direction Y.

The operation of the fifth embodiment of the present invention is substantially the same as that of the first embodiment as shown in FIG. 4. The fifth embodiment of the present invention is particularly constructed such that a line 39 formed by the contact of the discharging valve 38 to the valve seat 32 is substantially in an elliptical form as shown in FIG. 11 which provides sealing property to prevent gas from flowing from a high pressure portion outside the compression chamber to the compression chamber. Further, since the contacting line 39 is substantially in an elliptical form and is in a waveform out of the same plane, the contacting width for sealing formed by the oil film is reduced at the lower part of the valve seat 32 at the opening operation of the discharging valve 38 to thereby prevent delay in the opening operation. Further, noise produced by breaking the oil film for preventing the reverse flow of gas at the opening operation of the discharging valve 38 is reduced due to reduction in the oil film resistance. In addition, since the contacting area between the discharging valve 38 and the valve seat 32 is substantially in the elliptical form, a position of the valve seat at which the discharging valve separates from the valve seat at its opening operation is fixed and the fluctuation of noise level is small because acoustic property of the discharged gas is uniform.

As described above, the fifth embodiment of the present invention is constructed in such a manner that the recessed portion of the discharging valve 38 as a curved surface in which the radius of curvature in the longitudinal direction X of the discharging valve is different from the radius of curvature in the transverse direction Y of the same so that a ring-shaped contacting line of a substantially waved elliptical form is given on the valve seat 32 when the discharging valve 38 is brought into contact with the valve seat 32. Accordingly, the width of the oil film for contact sealing produced when the discharging valve 38 is on the valve seat 32 is small at the lower position of the valve seat 32 to thereby prevent delay in the opening operation of the discharging valve 38 with the result of increasing efficiency of the compressor. Further, noise produced by breaking the oil film at the time of opening operation of the discharging valve 38 is suppressed because energy for breaking the oil film is small. In addition, since a position of the valve seat at which the discharging valve separates from the valve seat at the opening operation of the discharging valve is fixed, the fluctuation of noise level is reduced.

The sixth to the tenth embodiments of the present invention will be described with reference to FIGS. 12 to 18.

Figure 12A:
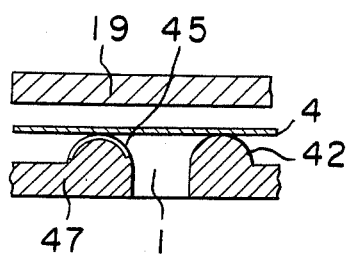
FIG. 12A is a cross sectional view of an essential part of the sixth embodiment of the discharging valve device of the present invention.
Figure 12B:
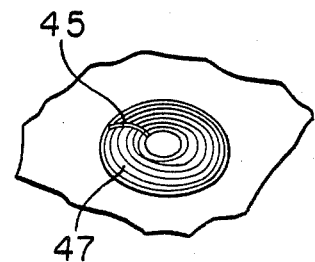
FIG. 12B is a perspective view of the discharging valve of the sixth embodiment.

FIG. 12A is a sectional view of the discharging valve device of the sixth embodiment of the present invention and FIG. 12B is a perspective view of a valve seat used in the sixth embodiment wherein the reference numeral 1 designates a discharging port formed in a housing 47, the numeral 42 designates a valve seat having a uniform radius of curvature in view of the cross section, which is formed integrally with the housing 47 at the peripheral portion of the discharging port 1, the numeral 19 designates a discharging valve fixture, the numeral 4 designates a discharging valve having a flat surface which is similar to the valve as in FIG. 1 and the numeral 45 designates a slit formed in the valve seat 42 so as to cross a circumference having the same center as the discharging port 1.

The operation of the sixth embodiment of the present invention is substantially the same as that of the first embodiment as described with reference to FIG. 4. Resistance taking place when the discharging valve is about to open is primarily determined by the width of the oil film for contact sealing and the thickness of the oil film at the contacting area formed between the discharging valve 4 and the valve seat 42. In the sixth embodiment of the present invention, a slit is formed in the valve seat 42 so as to cross a circumference having the same center as the discharging port 1 to reduce the width of the oil film for contact sealing to thereby control the content of oil film deposited. Consequently, the resistance of the oil film is reduced at the opening operation of the discharging valve 4 to prevent delay in the opening operation. A smooth opening operation of the discharging valve 4 suppresses noise produced to a lower level. Further, since a single slit 45 is formed in the valve seat 42, the direction to open the discharging valve 4 in the initiation of the opening operation is fixed whereby fluctuation of acoustic property can be small. It is, however, noted that the valve seat 42 having a deeper slit 45 is not desirable for the purpose of increasing gas-sealing property when the discharging valve 4 is closed.

Figure 13:
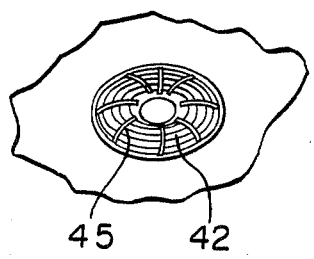
FIGS. 13 to 16 are perspective views showing the valve seat of the seventh to tenth embodiments of the present invention.
Figure 14:
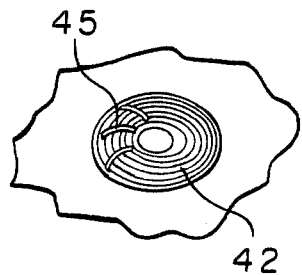
Figure 15:
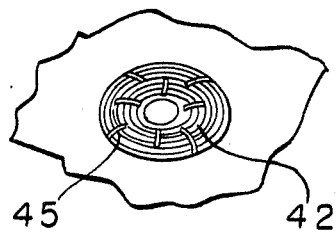
Figure 16:
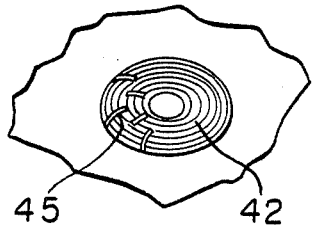

FIGS. 13 and 14 respectively show the seventh and eighth embodiments of the present invention in which a plurality of slits 45 are formed in the valve seat 42 in a radial form with respect to the discharging port and FIGS. 15 and 16 respectively show the nineth and tenth embodiments of the present invention in which a plurality of slits 45 are formed in the valve seat 42 in a radial form so as to be alternately arranged at the inner part and outer part with respect to the top portion of the valve seat.

Figure 17:
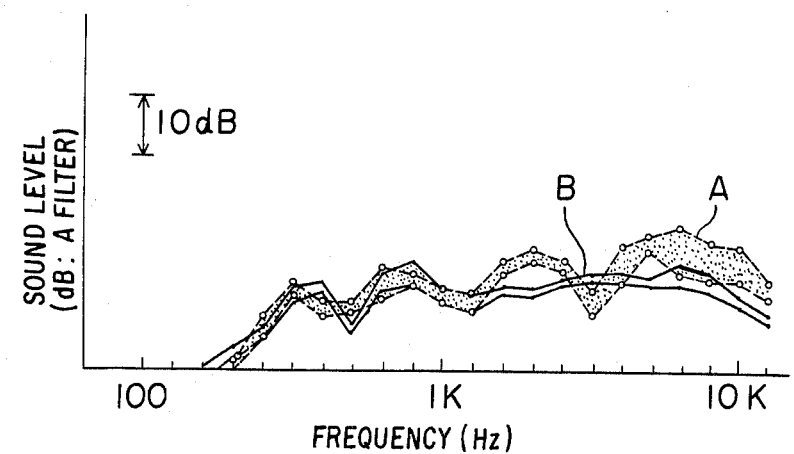
FIG. 17 is a diagram showing noise characteristic of the sixth, eighth and tenth embodiments of the present invention which are respectively shown in FIGS. 12, 14 and 16.
Figure 18:
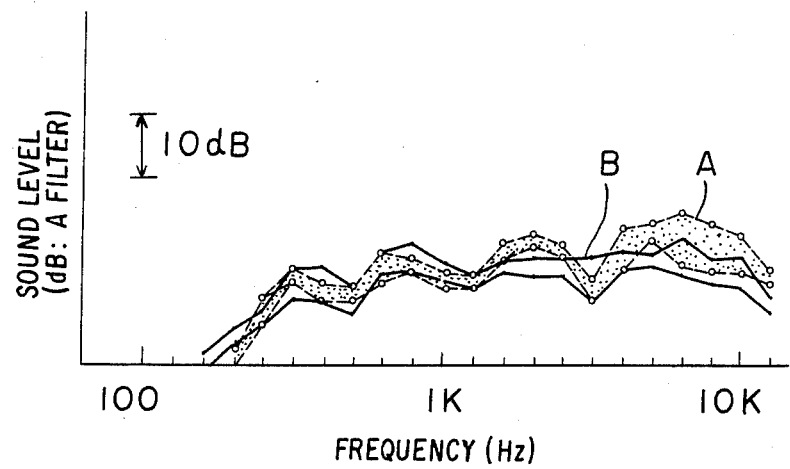
FIG. 18 is a diagram showing noise characteristic of the seventh and nineth embodiments of the present invention which are respectively shown in FIGS. 13 and 15.

Description will be made as to how noise property is improved by the sixth to tenth embodiments of the present invention. FIGS. 17 and 18 are respectively graphs showing comparison of noise property B obtained by the embodiments with noise property A of the conventional discharging valve device. It is understood from FIG. 17 that the sixth, eighth and tenth embodiments corresponding respectively to FIGS. 12, 14 and 16 in which a single or plurality of slits 45 are eccentrically arranged, improve both noise level and the fluctuation in comparison with those A of the conventional device. FIG. 18 shows performance of the seventh and nineth embodiments corresponding respectively to FIGS. 13 and 15 in which plurality of slits are uniformly arranged. It is understood from FIG. 18 that the embodiments as in FIGS. 13 and 15 do not improve noise level in comparison with those A of the conventional device.

As described above, the sixth to the tenth embodiments of the present invention are provided with a single or plurality of slits which are formed in the valve seat 42 so as to cross a circumference having the same center as the discharging port whereby delay in the opening operation of the discharging valve 4 is improved. Further, since the opening operation of the discharging valve 4 is made smooth, noise produced at the opening operation is reduced. In addition, provision of the slits eccentrically arranged renders the direction to open the discharging valve 4 to be uniform and the fluctuation of noise at the opening operation of the discharging valve to be suppressed.

Figure 19A:
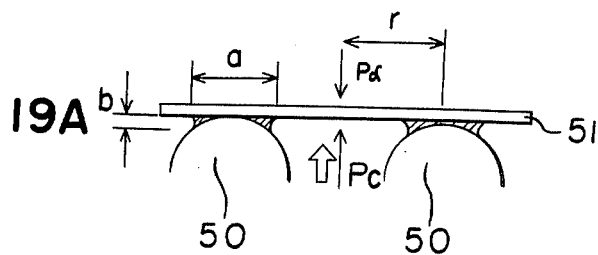
FIGS. 19 (A)–(E) are respectively diagrams for the purpose of illustrating strength of an oil film obtained by each embodiment of the present invention.
Figure 19B:
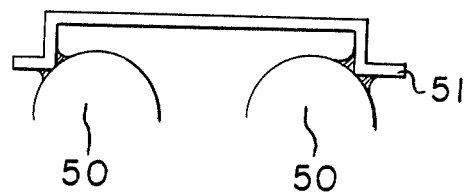
Figure 19C:
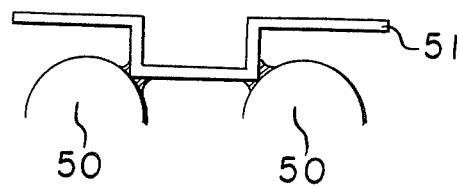
Figure 19D:
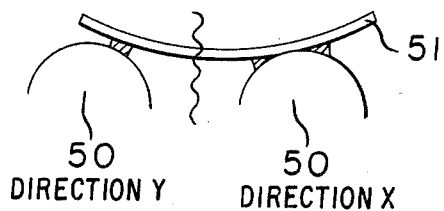
Figure 19E:
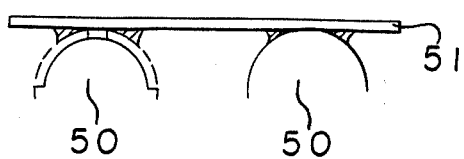

Description will be made as to the strength of the layer of a lubricating oil formed between the discharging valve and the valve seat, which is the important point of the present invention, with reference to FIG. 19. FIGS. 19A to 19E schematically show conditions of the oil film formed by the contact of the discharging valve 51 to the valve seat 50 and conditions of surface tension of the lubricating oil, wherein FIG. 19A shows deposition of the oil film at the contacting area in the conventional discharging valve device as in FIG. 1; FIG. 19B shows the first embodiment of the present invention corresponding to FIG. 4; FIG. 19C shows the third embodiment of the present invention corresponding to FIG. 7; FIG. 19D shows the fifth embodiment corresponding to FIG. 11 and FIG. 19E shows the sixth embodiment corresponding to FIG. 12.

Now, easiness of opening the discharging valve will be examined. Easiness of opening $\alpha$ is expressed by the equation (1).

$$\text{Easiness of opening: } \alpha = \frac{\Sigma F}{\Sigma P} \quad (1)$$

wherein $\Sigma F$ is surface tension of oil and $\Sigma P$ is pressure difference between an inner pressure Pc and an outer pressure Pd.

The surface tension of oil $\Sigma F$ and pressure difference $\Sigma P$ are respectively expressed by the euqations (2), (3).

$$\Sigma F = 2\pi r a \cdot F \ldots \quad (2)$$

$$\Sigma P = \pi r^2 \cdot \Delta P = \pi r^2 \cdot (Pd - Pc) \ldots \quad (3)$$

wherein a is an average width of oil film and r is an average radius of oil film.

The equation (4) is obtained by substituting the equations (2), (3) into the equation (1) and by rearranging it.

$$\frac{\Sigma F}{\Sigma P} = \frac{2\pi r a \cdot F}{\pi r^2 \cdot \Delta P} = \frac{2a}{r} \cdot \frac{F}{\Delta P} \propto \frac{a}{r} \quad (4)$$

Accordingly, the equation 4 represents that the easiness of opening $\alpha$ of the discharging valve is proportional to a/r.

Here, description will be made as to the easiness of opening $\alpha_1$ in the conventional discharging valve shown in FIG. 19A and each of the easiness of opening $\alpha_2$ to $\alpha_5$ of the embodiments shown in FIGS. 19B to 19E wherein the affixed numerals 1 to 5 correspond characters A to E of FIG. 19. When an example is taken from FIG. 19B, the condition of $a_2 <$ TM $a_1$, $r_2 > r_1$ is established. Accordingly, the value $\alpha_2$ is smaller than the value $\alpha_1$ as apparent from the following equation.

$$\alpha_2 = \frac{a_2}{r_2} < \frac{\frac{1}{2} a_1}{r_1} < \frac{a_1}{r_1} = \alpha_1$$

In the case of FIG. 19C, the condition of $a_3 <$ TM $a_1$, $r_3 < r_1$ is established and when $r_3 > r_1$, then, $\alpha_3 < \alpha_1$; on account of which $\alpha_3$ is smaller than $\alpha_1$ under a certain condition. Incidentally, when an ordinary compressor is used, the conditions as above-mentioned are satisfied and there is no substantial condition.

In the case FIG. 19D, as apparent from the Figure, the condition of $a_4 < a_1$ and $r_4 < r_1$ are established and when $a_4/a_1 < r_2/r_1$, then $\alpha_4 < \alpha_1$. Accordingly, the $\alpha_4$ is smaller than the $\alpha_1$ under a certain condition.

In the case FIG. 19E, the conditions of $a_5 < a_1$ and $r_5 = r_1$ are established and accordingly, $\alpha_5 = a_5/r_5 < a_1/r_1 = \alpha_1$ is established with the consequence of $\alpha_5 < \alpha_1$.

As described above, easiness of opening the discharging valve is obtainable under a certain condition for the embodiments as shown in FIGS. 19C and 19D. For the other embodiments, there is obtainable without any condition in comparison with the discharging valve as shown in FIG. 19A. Further, for sealing property, it is possible to practice the present invention by suitably selecting the dimensions of each part as far as refrigeration property is not impaired.

The discharging valve devices for compressors according to the eleventh and twelfth embodiments of the present invention will be described with reference to FIGS. 20 to 22.

Figure 20:
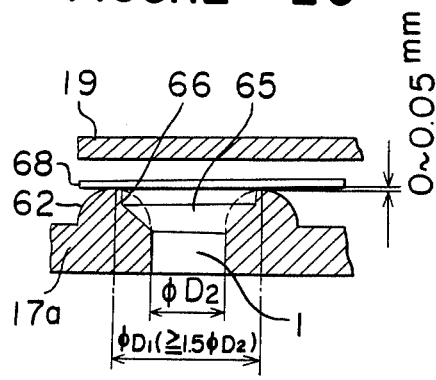
FIG. 20 is a sectional view of an essential part of eleventh embodiment of the discharging valve device for a compressor of the present invention.

FIG. 20 is a cross-sectional view of the discharging valve of the eleventh embodiment of the present invention wherein the reference numeral 1 designates a discharging port formed in a housing 17a and the numeral 62 designates a valve seat formed integrally with the housing 17a at the peripheral portion of the discharging port 1 in a projecting form. The shape of the projection in cross section is in a curved outline drawn with a predetermined radius and an annular step 66 having the same center as the discharging port 1 is formed between the top portion of the surface having the certain curvature at the discharging port side and 0.05 mm below from the top portion. The numeral 19 refers to a discharging valve fixture and the numeral 63 indicates a discharging valve which is brought contact with the top portion of the projection of the valve seat 62. The diameter $D_1$ of the annular projection of the valve seat 62 is selected to be 1.5 times as much as the diameter $D_2$ of the discharging port 1.

The operation of the eleventh embodiment of the present invention is substantially the same as that of the first embodiment shown in FIG. 4. This embodiment is provided with the valve seat 62 for sealing gas being apt to reversely flow from a high pressure portion outside the compressor into the same and the valve seat 62 preventing delay in the opening operation of the discharging valve 68. The delay in the opening operation largely depends on contacting pressure which is determined by mutual relationship of pressure applied to at the contacting surface between the discharging valve 68 and the valve seat 62 and a contacting area taking the content of the oil, i.e. the thickness of the oil film into consideration. The contacting pressure can be reduced by changing the shape in cross section of the valve seat 62 to thereby reduce the contacting area; thus, the content of the oil in the oil film deposited at the contacting area is controlled so that resistance of the oil film produced at the opening operation of the discharging valve 68 is decreased. Further, noise produced by breaking the oil film for contact sealing at the opening operation of the discharging valve 68 is suppressed to a lower level. FIG. 22 shows performance of the discharging valve device B of the present invention as compared with the performance of the conventional device A.

Figure 21:
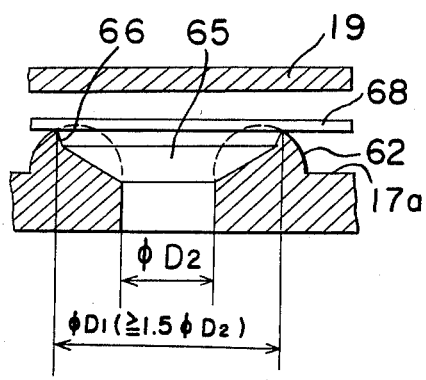
FIG. 21 is a sectional view similar to FIG. 20 of the twelfth embodiment of the discharging valve device of the present invention.
Figure 22:
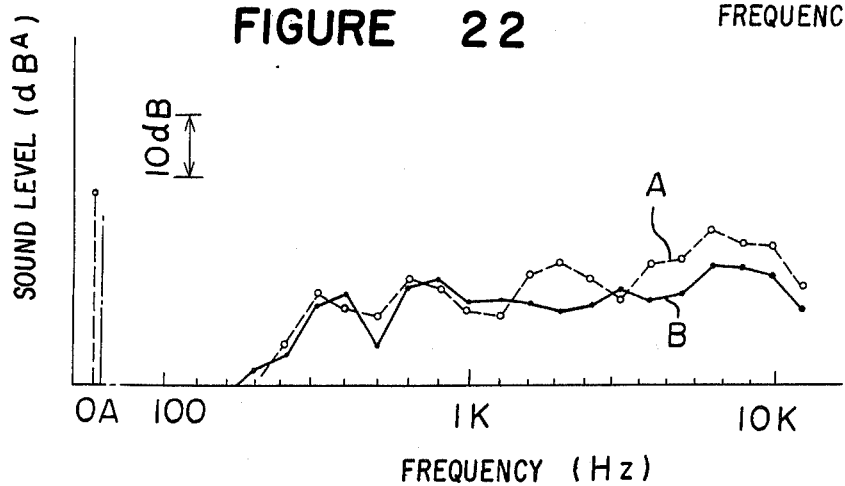
FIG. 22 is a graph for comparing and analyzing noise suppression effect in case of using the eleventh embodiment of the discharging valve device of the present invention.

FIG. 21 is a sectional view of the discharging valve device of the twelfth embodiment of the present invention. The shape of the projection of the valve seat 62 in cross section is in a curved outline drawn with a predetermined radius and there is formed a recessed portion 65 whose circular edge is at a position outside the top portion of the projection having the radius of curvature and which is inwardly inclined to form a substantially conical form with the same axial center as the discharge port 1 whereby delay in the opening operation of the discharging valve 68 and production of noise are eliminated as in the eleventh embodiment.

The recessed portion 65 of the valve seat 62 has a step portion 66 formed of a steep slope at a position beyond the top portion of the projection where the discharging valve 68 is made contact with. In the study of positional relationship between the top portion of the projection and the step portion 66, it has been found that when a gap between the top portion of the projection as a contacting areaion and the top edge of the step portion 66 is in a range from 0 to 0.05 mm, the optimum discharging efficiency can be obtained.

It has been also found that in the relationship between the diameter of the top portion of the annular projection where the discharging valve 68 is come to contact with the valve seat 62 and the diameter of the discharging port 1, a suitable contacting pressure of the discharging valve 68 to the valve seat 62 is obtained by providing the diameter of the top portion to satisfy a related equation $D_1 = \geq 1.5 D_2$ where $D_1$ is the contacting diameter of the top portion of the projection and $D_2$ is the diameter of discharging port 1, an excellent discharging efficiency can be obtained.

Thus, the eleventh and twelfth embodiments of the present invention are respectively constructed in such a manner that the ratio of the diameter of the top portion of the valve seat to the diameter of discharging port is 1.5 times or more; a curved surface having a curvature is formed at a position outside the contacting point between the valve seat and the discharging valve and a step portion is formed at the inner side of the top portion of the projection. With the construction, the content of the oil deposited between the valve seat and the discharging valve which corporates to form a contacting area is limited and resistance of the oil film produced at the opening operation of the discharging valve is reduced thereby preventing delay in the opening operation of the discharging valve.

Further, since energy for breaking the oil film required at the opening operation of the discharging valve is small, noise produced at the breaking of the oil Z5 film can be suppressed.

In addition, since the uppermost end of the recessed portion is made greater than the diameter of the discharging port, the flow rate of gas discharged is tenderly at the outlet of the discharging port to thereby lower pressure loss and to control disturbance in flow and pulsating phenomenon of the discharged gas.

Finally, the discharging valve devices for a compressor of the thirteenth and fourteenth embodiments of the present invention will be described with reference to FIGS. 23 to 25.

Figure 23:
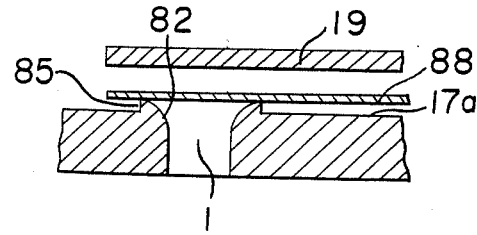
FIG. 23 is a cross-sectional view of the thirteenth embodiment of the discharging valve device of the present invention.

FIG. 23 is a cross-sectional view of the thirteenth embodiment of the present invention wherein the reference numeral 1 designates a discharging port formed in a housing 17a and the reference numeral 82 refers to a valve seat formed integrally with the housing 17a at the peripheral portion at the discharging side of the discharging port 1. The profile of the valve seat 82 is such that a surface continuously extending from the inner surface of the discharging port 1 is converged to a curved surface having a predetermined radius of curvature and a step portion 85 having a steep slope is formed at a position outside the top portion of the curved surface, namely at the opposite side of the discharging port. The numeral 19 designates a discharging valve fixture and the numeral 88 designates a discharging valve which is come to contact with the top portion of the projection of the valve seat 82.

The operation of the thirteenth embodiment of the present invention is substantially same as that of the first embodiment as shown in FIG. 4. Particularly, the valve seat 82 of the embodiment has sealing property to prevent gas from reversely flowing from a high pressure portion outside the compressor into the compressor and prevents delay in the opening operation of the discharging valve 88. The delay in the opening operation largely depends on relationship between pressure difference at the contacting area of the valve seat 82 to the discharging valve 88 and a contacting area taking the content of oil, namely the thickness of the oil film into consideration. The contacting pressure can be reduced by changing the shape of the valve seat 82 to reduce its contacting area. A small contacting area reduces deposition of the oil film formed at the contacting point to thereby reduce resistance of the oil film produced at the opening operation of the discharging valve 88 with the consequence that there takes place no delay in the opening operation. Further, noise produced by breaking the oil film for preventing reverse flow of gas can be suppressed to a lower level as shown in FIG. 25 in which performance of the valve discharging device B of the thirteenth embodiment is superior to the performance of the conventional device A.

Figure 24:
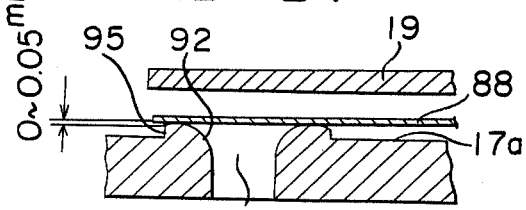
FIG. 24 is a sectional view of the fourteenth embodiment of the valve discharging device of the present invention.
Figure 25:
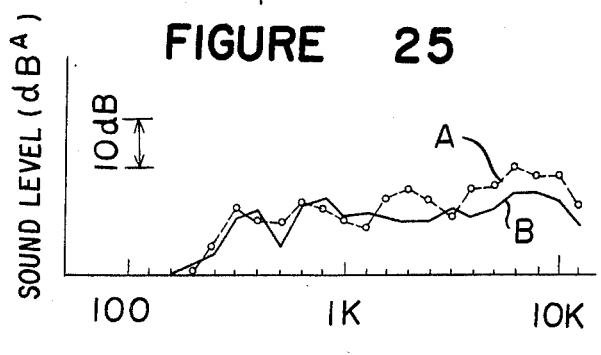
FIG. 25 is a graph for comparing and analyzing noise suppression effect in case of using the thirteenth embodiment of the discharging valve device of the present invention.

FIG. 24 is a cross sectional view of the valve dishcarging device of the fourteenth embodiment of the present invention. The shape in cross section of the valve seat 92 is such that a surface continuously extending from the inner wall of the discharging port 1 is converged to a curved surface having a predetermined radius of curvature and a step portion 95 having a steep slope is formed at a position beyond the top portion of the curved surface drawn by such radius of curvature. The valve seat of this embodiment prevents delay in the opening operation of the discharging valve 88 and suppresses noise as the device of the thirteenth embodiment.

In the study concerning positional relationship between the top portion of the projection to which the discharging valve 88 is come to contact and the step portion 95 formed at a position outside the top portion of the valve seat 92 as shown in FIG. 24, it has been revealed that the optimum gap is obtained for efficient discharging operation when the gap between the top portion of the projection and the step portion 95 is in the range from 0 to 0.05 mm.

According to the thirteenth and fourteenth embodiments of the present invention, the curved surface having a certain radius of curvature is in the valve seat at a position where the discharging valve comes to contact with and a step portion is formed outside the contacting point to reduce deposition of oil film formed between the valve seat and the discharging valve and to reduce resistance of the oil film produced at the opening operation of the discharging valve to thereby prevent delay in the opening operation.

Further, energy for breaking the oil film can be small at the opening operation of the discharging valve to suppress noise produced at the breaking of the oil film.

We claim:

1. A discharging valve device in a compressor which discharges gas compressed in a compression chamber outside said chamber against an urging force of a discharging valve pressing a valve seat and resistance of breaking the film of a lubricating oil deposited at and near a contacting area formed between the valve seat and the discharging valve, comprising:
   a discharging port communicated with a compression chamber,
   a valve seat formed at the peripheral portion of said discharging port and having a radius of curvature in cross section, and
   a discharging valve having means for forcibly bringing said discharging valve into contact with a part of said valve seat so as to open and close said discharging port depending on pressure in said compression chamber, wherein said discharging valve is not flat and is shaped such that a contacting width of a seal formed by the contact between said discharging valve and said valve seat and a surrounding oil film is smaller than a contacting width a seal formed by the contact between a discharging valve and a valve seat and a surrounding oil film in case of a flat discharging valve.

2. The discharging valve device according to claim 1, wherein said discharging valve is shaped such that the contact between said discharging valve and said valve seat of said seal is at a position spaced from the top portion of said valve seat.

3. The discharging valve device according to claim 1, wherein said discharging valve has a corner at which the valve is brought to contact with said valve seat.

4. The discharging valve device of claim 3 wherein said discharging valve comprises a first element having an opening at a position corresponding to said discharging port, and a second element covering said opening of said first element, wherein said corner is formed at an edge of said opening.

5. The discharging valve device according to claim 1, wherein a part of said discharging valve forming said seal is formed by a curved surface having an anisotropy.

6. The discharging valve device according to claim 1, wherein a part of said discharging valve forming said seal is in substantially elliptical form.

7. The discharging valve device according to claim 1, wherein the height of said valve seat in its circumferential direction is uniform.

* * * * *